April 25, 1967   A. FISCHER   3,315,558
EXPANSION PLUG
Filed Oct. 16, 1964

INVENTOR.
ARTUR FISCHER
BY
Michael S. Striker

United States Patent Office 3,315,558
Patented Apr. 25, 1967

3,315,558
EXPANSION PLUG
Artur Fischer, Tumlingen, Kreis Freudenstadt, Germany
Filed Oct. 16, 1964, Ser. No. 404,368
Claims priority, application Germany, Nov. 5, 1963,
F 24,817
6 Claims. (Cl. 85—80)

The present invention relates to fasteners in general, and more particularly to an improved expansion plug.

Conventional expansion plugs may be divided in two groups. One group comprises expansion plugs of the type wherein a slotted stem forms a pair of elongated tongues which are inserted into an expansion anchor hole and are thereupon caused to move away from each other by driving a screw, bolt or another threaded element into the slot therebetween whereby the tongues engage the material which surrounds the expansion anchor hole and anchor the plug. The other group comprises expansion plugs including partially slotted stems which consist of ductile material and have end portions provided with internal threads. By inserting the partially slotted stem into an expansion anchor hole and by thereupon bringing a bolt or a screw into mesh with the internally threaded end portion, the operator may deform the slotted portion of the stem into strong frictional engagement with the material which surrounds the hole.

A serious drawback of such expansion plugs is that they comprise several independent parts each of which must be produced in a different machine. Also, the cost of such plugs is comparatively high, particularly if the stem must be provided with internal threads. Furthermore, the danger of losing one component is always present and the operator must resort to a screwdriver or to an analogous tool in order to properly anchor the plug in the hole of a brick wall or another comparatively brittle supporting structure.

Accordingly, it is an important object of the present invention to provide an exceptionally simple, inexpensive, reliable and wear-resistant expansion plug which may be inserted and/or removed without necessitating the use of tools, which may be reused as often as desired, which may be applied or removed by unskilled persons, and which may be used with equal advantage in expansion anchor holes of circular, oval or polygonal cross section.

Another object of the invention is to provide an expansion plug which may be manufactured as an integral part of a clothes hook, pipe clamp or a similar carrier and which, when properly inserted, is capable of resisting axial and/or torsional stresses to remain safely anchored in a wall structure consisting of brick, wood, metal or other material.

A further object of the invention is to provide an expansion plug of the above outlined characteristics which may be used indoors or outdoors and which, when used outdoors, can resist the corrosive influence of moisture, dust and/or air.

An additional object of the instant invention is to provide an expansion plug which may be furnished in any desired size and whose retaining action may be adjusted in a very simple and time-saving manner.

Briefly stated, one feature of my invention resides in the provision of an expansion plug which may be received in an expansion anchor hole extending inwardly from the exposed side of a brick wall or another supporting structure. The plug comprises a head which may be integral with or is detachably connected to a clothes hook, pipe clamp or another suitable carrier, a pair of elongated deformable tongues defining between themselves an elongated slot and having end portions which are integral with the head, and resilient means for biasing the tongues away from each other so as to widen at least a portion of the slot. Thus, when the tongues are inserted into an expansion anchor hole whose transverse dimensions are sufficiently small to necessitate deformation of tongues, the resilient means biases the tongues into strong frictional engagement with the material which surrounds the expansion anchor hole.

In accordance with a preferred embodiment of my invention, the tongues comprise first end portions which are integral with the head, interconnected second end portions which are distant from the head, and outwardly bulging median portions which are located between the first and second end portions and are biased by the resilient means. Such resilient means may comprise helical springs, leaf springs or inserts made of elastomeric material, for example, rubber or sponge rubber. If the resilient means comprises leaf springs, such springs may be provided with recesses to be detachably supported by a web which connects the tongues intermediate the second end portions and the median portions thereof. When the median portions are deformed in a sense to move toward each other, the second end portions move away from each other and thus contribute to stronger retaining action.

The novel features which are considered as characteristic of the invention are set forth in particular in the appended claims. The improved expansion plug itself, however, both as to its construction and the mode of using the same, together with additional features and advantages thereof, will be best understood upon perusal of the following detailed description of certain specific embodiments with reference to the accompanying drawings, in which:

Figure 1:
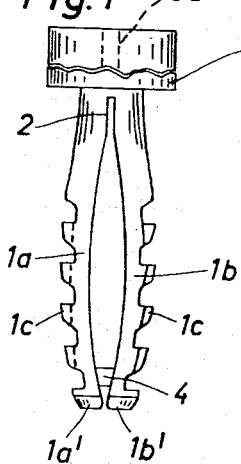
FIG. 1 is a side elevational view of a portion of an expansion plug which is constructed in accordance with a first embodiment of my invention.
Figures 2, 3, 4:
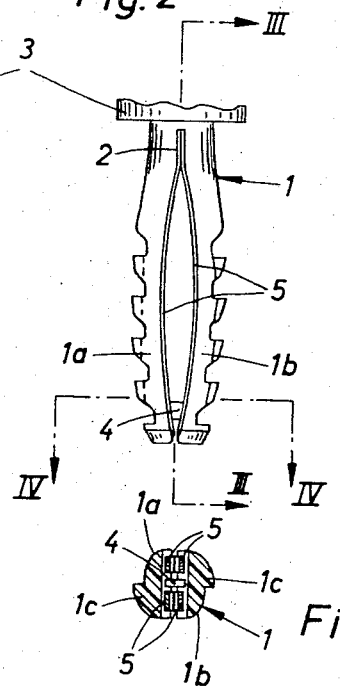
FIG. 2 is a fragmentary side elevational view of the fully assembled expansion plug.
FIG. 3 is a longitudinal section as seen in the direction of arrows from the line III—III of FIG. 2.
FIG. 4 is a transverse section as seen in the direction of arrows from the line IV—IV of FIG. 2.

Referring to FIG. 1, there is shown a portion of an expansion plug 1 which is constructed in accordance with a first embodiment of my invention. The plug comprises a cylindrical head 3 which is provided with an axially extending bore 3a adapted to receive a screw by means of which the plug may be attached to a clothes hook, pipe clamp or another carrier, not shown. One end of the head 3 is integral with the upper end portions of two elongated tongues 1a, 1b which define between themselves an elongated slot 2. The outer sides of the tongues 1a, 1b are provided with protuberances here shown as teeth 1c having axially extending faces to prevent rotation of the plug in the expansion anchor hole of a brick wall or a similar supporting structure. The lower end portions of the tongues 1a, 1b are connected to each other by a connector here shown as a narrow bridge-like web 4 which may be secured thereto by welding or by a suitable adhesive. The portion shown in FIG. 1 consists of tough, corrosion-resistant, elastically deformable synthetic plastic material, for example, polyamide, which may be used indoors or outdoors. It will be noted that the median portions of the tongues 1a, 1b bulge outwardly and away from each other when the tongues are in unstressed condition.

In accordance with the present invention, the plug 1 comprises resilient means for biasing the median portions of the tongues away from each other whereby the teeth 1c will be maintained in strong frictional engagement with the material of the supporting structure in which the plug is anchored. In fact, if the material of the supporting structure is very brittle, the teeth will actually penetrate into such material to further enhance the retaining action. In the embodiment of FIGS. 1 to 5, the resilient means comprises two arcuate leaf springs 5 which are inserted into the slot 2 and engage the internal surfaces of the tongues to keep their median portions apart in a manner shown in FIG. 2. The two springs may be connected to each other prior to insertion into the slot 2 or they may be inserted individually. In order to keep them in the slot 2, their lower end portions are provided with V-shaped recesses or cutouts 5a which receive the web 4, see FIG. 3. When the tongues 1a, 1b are inserted into an expansion anchor hole 6 which is drilled into a brittle wall 7 or into a similar supporting structure, see FIG. 5, the median portions of the tongues are flexed toward each other against the bias of the springs. Once the plug 1 is properly received in the hole 6, i.e., when the head 3 abuts against or is adjacent to the exposed side 7a of the wall 7, the bias of the springs 5 and the inherent resiliency of the tongues 1a, 1b will maintain the teeth 1c in strong frictional engagement with the material which surrounds the hole 6. Thus, the plug 1 is properly anchored in the wall 7 and can withstand substantial axial (extracting) forces. Also, the axially extending faces of the teeth 1c keep the plug 1 against rotation in the hole 6. The operator then uses a screw (not shown) which is driven into the bore 3a to affix a pipe clamp or a similar carrier whereby the carrier is held against rotation as well as against movement in a direction away from the exposed side 7a of the wall 7.

When the tongues 1a, 1b are inserted into the hole 6, their median portions move toward each other whereby the tongues pivot about the web 4 and their free ends or tips 1a', 1b' tend to move away from each other to further enhance the retaining action.

It is clear that the teeth 1c may be replaced by ribs, cylindrical or conical projections or similar protuberances as long as such protuberances keep the tongues against rotation with reference to the wall 7. Also, the web 4 need not be connected with both tongues; it often suffices to connect it with one of these tongues. Furthermore, the plastic material of the tongues 1a, 1b need not be elastic because the springs 5 will take care of expansion when the plug is properly anchored in the hole 6. In fact, the provision of springs 5 is of particular advantage when the material of the tongues is ductile or slightly elastic as well as when the nature of the material of the tongues is such that its elasticity decreases with time. Of course, when the springs 5 are inserted between a pair of elastically deformable tongues, the combined elasticity of springs and tongues insures that the plug is anchored with a considerable force and is held against any uncontrolled displacements with reference to the wall 7. On the other hand, the springs will enable the operator to remove the plug if the head 3 is pulled with a force which suffices to withdraw the tongues from the hole 6. Instead of exerting a pull on the head 3, the operator may also pull the carrier which is attached to the plug.

A set of expansion plugs may be furnished with several pairs of springs 5 whose elasticity is different so that the operator may select springs which will offer a desired resistance to movement of tongues 1a, 1b toward each other. Also, one of the springs 5 may be dispensed with so that one of the tongues is biased but the median portion of the other tongue tends to bulge outwardly solely in response to the bias of its own material.

The cutouts 5a may receive the web 4 with some clearance so that the springs 5 may be readily inserted into or removed from the slot 2. In the first step, the operator inserts the prongs at the lower ends of the springs 5, as viewed in FIG. 2 or 3, so that the cutouts 5a receive the web 4. In the next step, the remainder of each spring 5 is simply pushed into the slot 2 whereby the springs engage the internal surfaces of the tongues 1a, 1b and remain in the illustrated positions.

Figure 6:
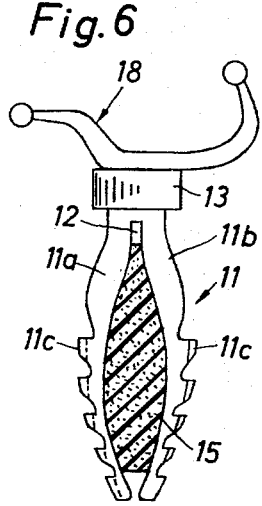
FIG. 6 is a side elevational view of a modified expansion plug whose head is integral with a clothes hook.
Figure 5:
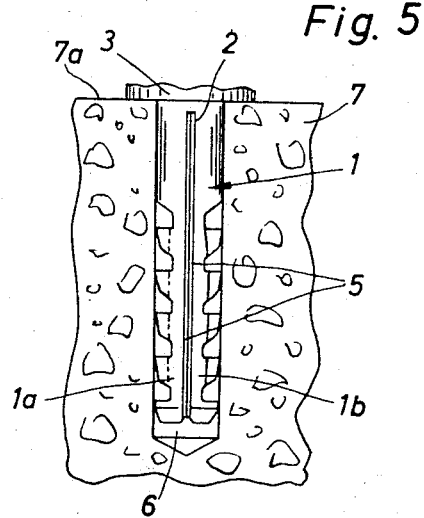
FIG. 5 is a section through a brick wall and illustrates the expansion plug of FIGS. 1 to 4 in operative position.

FIG. 6 illustrates a slightly modified expansion plug 11 which again comprises a head 13, a pair of tongues 11a, 11b which are separated by an elongated slot 12 and whose outwardly bulging median portions are biased by a resilient insert in the form of a block 15 consisting of sponge rubber or the like. The web 4 is omitted and the head 13 is integral with a two-pronged clothes hook 18. It is clear that the head 13 may be made integral with a pipe clamp, with a stud or with another suitable carrier, depending on the intended use of the plug. The insert 15 will be compressed when the tongues are inserted into an expansion anchor hole whose diameter is less than the maximum distance between the teeth 11c on the tongues 11a, 11b, and the insert then tends to expand the median portions of the tongues so that the teeth 11c engage the material which surrounds the expansion anchor hole. It is obvious that the insert 15 may be replaced by a block of rubber or other elastomeric material, by one or more helical springs, or by other types of resilient devices which are capable of biasing the median portions of the tongues away from each other.

Without further analysis, the foregoing will so fully reveal the gist of the present invention that others can, by applying current knowledge, readily adapt it for various applications without omitting features which fairly constitute essential characteritic of the generic and specific aspects of this invention and, therefore, such adaptations should and are intended to be comprehended within the meaning and range of equivalence of the following claims.

What is claimed as new and desired to be secured by Letters Patent is:

1. An expansion plug comprising a head; a pair of deformable elongated tongues defining between themselves an elongated slot, said tongues having first end portions integral with said head, second end portions distant from said head and having free ends located near to one another, and outwardly bulging median portions located intermediate said first and second end portions; a connector means interconnecting said second end portions in the region of said free ends and two elongated outwardly curved resilient leaf spring means extending in longitudinal direction thereof, each of said outwardly curved elongated leaf spring means being associated with at least said median portion of one of said tongues so as to bias the same outwardly away from each other and resisting movement of said tongues inwardly towards each other.

2. An expansion plug comprising a head; a pair of deformable elongated tongues defining between themselves an elongated slot, said tongues having first end portions integral with said head, second end portions distant from said head, and outwardly bulging median portions located intermediate said first and second end portions; connecting means extending across said slot between the second end portions of said tongues; and resilient means positioned between and in contact with the inner opposed faces of said outwardly bulging median portions of said tongues and constantly biasing said outwardly bulging median portions away from each other, said resilient means being so constructed and arranged as to provide some free and unobstructed space between said outwardly bulging median portions of said tongues for enabling relative movement thereof towards each other; and interengaging means between said resilient means and said tongues for retaining said resilient means between and in contact with said inner opposed faces of said outwardly bulging median portions of said tongues.

3. An expansion plug comprising a head; a pair of deformable elongated tongues defining between themselves an elongated slot, said tongues having first end portions integral with said head, second end portions distant from said head, means interconnecting said second end portions and outwardly bulging median portions located intermediate said first and second end portions; and resilient means comprising an arcuate leaf spring provided in said slot and engaging one of said tongues to bias said median portion of said one tongue away from the median portion of the other tongue, said leaf spring having means at one end engaging said interconnecting means to retain said spring in said slot.

4. A resilient expansion plug comprising a head; a pair of elongated deformable tongues defining between themselves an elongated slot, said tongues having first end portions integral with said head, second end portions distant from said head, and said tongues being oppositely bowed to define outwardly bulging median portions located intermediate said first and second end portions, at least said median portions being provided with external protruberances; an integral connecting web of less width than said tongues extending across said slot between the second end portions of said tongues; and a pair of arcuate elongated leaf springs of a width no greater than that of said tongues received in said slot and conforming to the bowed configuration of said tongues for biasing the median portions of said tongues away from each other, said springs having end portions provided with recesses being open at their lower ends for accommodating said web.

5. An expansion plug comprising a head; a pair of deformable elongated tongues defining between themselves an elongated slot, said tongues having first end portions integral with said head, second end portions distant from said head, and outwardly bulging median portions located intermediate said first and second end portions; resilient means positioned between and in contact with the inner opposed faces of said outwardly bulging median portions of said tongues and constantly biasing said outwardly bulging median portions away from each other, said resilient means being so constructed and arranged as to provide some free and unobstructed space between said outwardly bulging median portions of said tongues for enabling relative movement thereof towards each other; and interengaging means between said resilient means and said tongues for retaining said resilient means between and in contact with said inner opposed faces of said outwardly bulging median portions of said tongues; and carrier means secured to said head.

6. An expansion plug comprising a head; a pair of elastically deformable elongated tongues defining between themselves an elongated slot, said tongues having first end portions integral with said head, second end portions distant from said head, and outwardly bulging median portions located intermediate said first and second end portions; a connector extending across said slot and secured to said tongues intermediate said second end portions and said median portions so that the second end portions move away from each other in response to deformation of said tongues in a sense to move said outwardly bulging median portions toward each other; and resilient means positioned between and in contact with the inner opposed faces of said outwardly bulging median portions of said tongues and constantly biasing said outwardly bulging median portions away from each other, said resilient means being so constructed and arranged as to provide some free and unobstructed space between said outwardly bulging median portions of said tongues for enabling relative movement thereof towards each other; and interengaging means between said resilient means and said tongues for retaining said resilient means between and in contact with said inner opposed faces of said outwardly bulging median portions of said tongues.

References Cited by the Examiner

UNITED STATES PATENTS

| 840,651 | 1/1907 | Otto. | |
|---|---|---|---|
| 1,153,797 | 9/1915 | Kegreisz. | |
| 2,006,813 | 7/1935 | Norwood | 85—14 |
| 2,407,160 | 9/1946 | Kahn | 151—31 |
| 3,187,620 | 6/1965 | Fischer | 85—84 |

FOREIGN PATENTS

| 320,872 | 5/1920 | Germany. |
|---|---|---|
| 295,595 | 3/1954 | Switzerland. |

CARL W. TOMLIN, *Primary Examiner.*

R. S. BRITTS, *Assistant Examiner.*